(12) United States Patent
Yoshii et al.

(10) Patent No.: US 7,372,638 B2
(45) Date of Patent: May 13, 2008

(54) LENS BARREL

(75) Inventors: Manabu Yoshii, Yokohama (JP);
Sayoko Okabe, Hachioji (JP); Akira Watanabe, Fuchu (JP); Yasuteru Yamauchi, Tokyo (JP); Shigeo Hayashi, Okaya (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 11/657,309

(22) Filed: Jan. 24, 2007

(65) Prior Publication Data
US 2007/0171554 A1    Jul. 26, 2007

(30) Foreign Application Priority Data
Jan. 25, 2006    (JP)    ............................... 2006-016917

(51) Int. Cl.
*G02B 15/14* (2006.01)
*G02B 7/02* (2006.01)
*G03B 17/00* (2006.01)

(52) U.S. Cl. ...................... 359/699; 359/700; 359/701; 359/704; 359/694; 359/823; 359/825; 359/826; 359/828; 396/72; 396/89

(58) Field of Classification Search ........ 359/694–704, 359/819, 823–826, 828, 830; 396/29, 72, 396/76, 82, 84, 89, 349, 448, 529; 348/340.3, 348/360, 361, 375, E5.028; 353/97, 100, 353/101
See application file for complete search history.

(56) References Cited

U.S. PATENT DOCUMENTS

| | | | |
|---|---|---|---|
| 6,081,391 A * | 6/2000 | Nishio et al. | 359/700 |
| 6,195,212 B1* | 2/2001 | Miyamoto | 359/699 |
| 6,469,841 B2* | 10/2002 | Nomura et al. | 359/699 |
| 6,839,187 B2* | 1/2005 | Nomura et al. | 359/700 |
| 6,987,930 B2* | 1/2006 | Nomura | 396/73 |
| 7,130,132 B2* | 10/2006 | Lee | 359/704 |
| 7,184,228 B2* | 2/2007 | Hamasaki et al. | 359/825 |

FOREIGN PATENT DOCUMENTS

| | | |
|---|---|---|
| JP | 8-313788 A | 11/1996 |
| JP | 2004-252365 A | 9/2004 |

* cited by examiner

*Primary Examiner*—Loha Ben
(74) *Attorney, Agent, or Firm*—Frishauf, Holtz, Goodman & Chick, P.C.

(57) ABSTRACT

There is disclosed a lens barrel including a fixed frame, a rotary frame rotatable with respect to the fixed frame to advance or retract in an optical axis direction, and a rectilinear guide frame rotatable relative to the rotary frame to displace integrally with the rotary frame in the optical axis direction. In this structure, a front end portion of the rectilinear guide frame on a subject side in the optical axis direction is exposed from the rotary frame.

20 Claims, 8 Drawing Sheets

LENS BARREL

CROSS-REFERENCE TO RELATED APPLICATION

This application is based upon and claims the benefit of priority from prior Japanese Patent Application No. 2006-016917, filed on Jan. 25, 2006, the entire contents of which are incorporated herein by reference.

BACKGROUND OF THE INVENTION

1. Field of the Invention

The present invention relates to the structure of a lens barrel having a rotary frame and a rectilinear guide frame which advances or retracts together with the rotary frame.

2. Description of the Related Art

A popular retractable lens barrel has such a structure that it is housed inside a camera body when not in operation, popping out of the camera body upon shooting. Further, recent retractable lens barrels typically advance or retract for a zooming operation of an optical system during shooting.

A typical structure of a lens barrel to advance or retract like those mentioned above has a driving frame, a rectilinear guide frame, and a driven frame. The driving frame is provided with a helicoid or cam. The rectilinear guide frame is displaced integrally with the driving frame in an optical axis direction to turn around the optical axis relative to the driving frame. The rectilinear guide frame has a rectilinear guide extending in the optical axis direction. The driven frame is engaged with the helicoid or cam provided in the driving frame. Further, the driven frame is engaged with the rectilinear guide provided in the rectilinear guide frame, so that the driven frame is advanced or retracted by the driving frame in the optical axis direction in such a state that it is guided by the rectilinear guide frame in the optical axis direction.

In addition, conventional lens barrels are also required to be light-tight to prevent an unwanted or stray light flux from entering the lens barrels in order not to cause flare or ghost. To this end, for example, such a structure that only either the driving frame or the rectilinear frame is exposed to the outside of the lens barrel is typically employed to prevent the unwanted light flux from entering the lens barrel.

The aforementioned conventional lens barrel structure is proposed, for example, in Japanese Patent Application Laid-Open Nos. 8-313788 and 2004-252365.

BRIEF SUMMARY OF THE INVENTION

The lens barrel of the present invention includes a fixed frame, a rotary frame rotatable with respect to the fixed frame to advance or retract in an optical axis direction, and a rectilinear guide frame rotatable with respect to the rotary frame to displace integrally with the rotary frame in the optical axis direction, wherein the front end of the rectilinear guide frame on a subject side in the optical axis direction is exposed from the rotary frame.

An exemplary structure of the lens barrel of the present invention is as follows: A lens barrel comprising: a fixed frame; a rotary frame for rotating with respect to the fixed frame to advance or retract with respect to the fixed frame in an optical axis direction; a rectilinear guide frame arranged inside the rotary frame to be movable relative to the rotary frame and to displace integrally with the rotary frame in the optical axis direction; a circumferential groove provided around the outer circumference of the rectilinear guide frame; and an engaging protrusion provided around the inner circumference of the rotary frame to engage with the circumferential groove, wherein the front end of the rectilinear guide frame on a subject side in the optical axis direction is exposed from the rotary frame.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

A preferred embodiment of the invention is described below with reference to the accompanying drawings.

In the following description, the optical axis of a photographing lens in the lens barrel is expressed as an optical axis O, the direction of a subject side along the optical axis O is expressed as front or forward, and the direction of an imaging side (image pickup device side) is expressed as rear or rearward. Further, the rotation direction is indicated as a rotation direction as viewed from the subject side.

Figure 1:
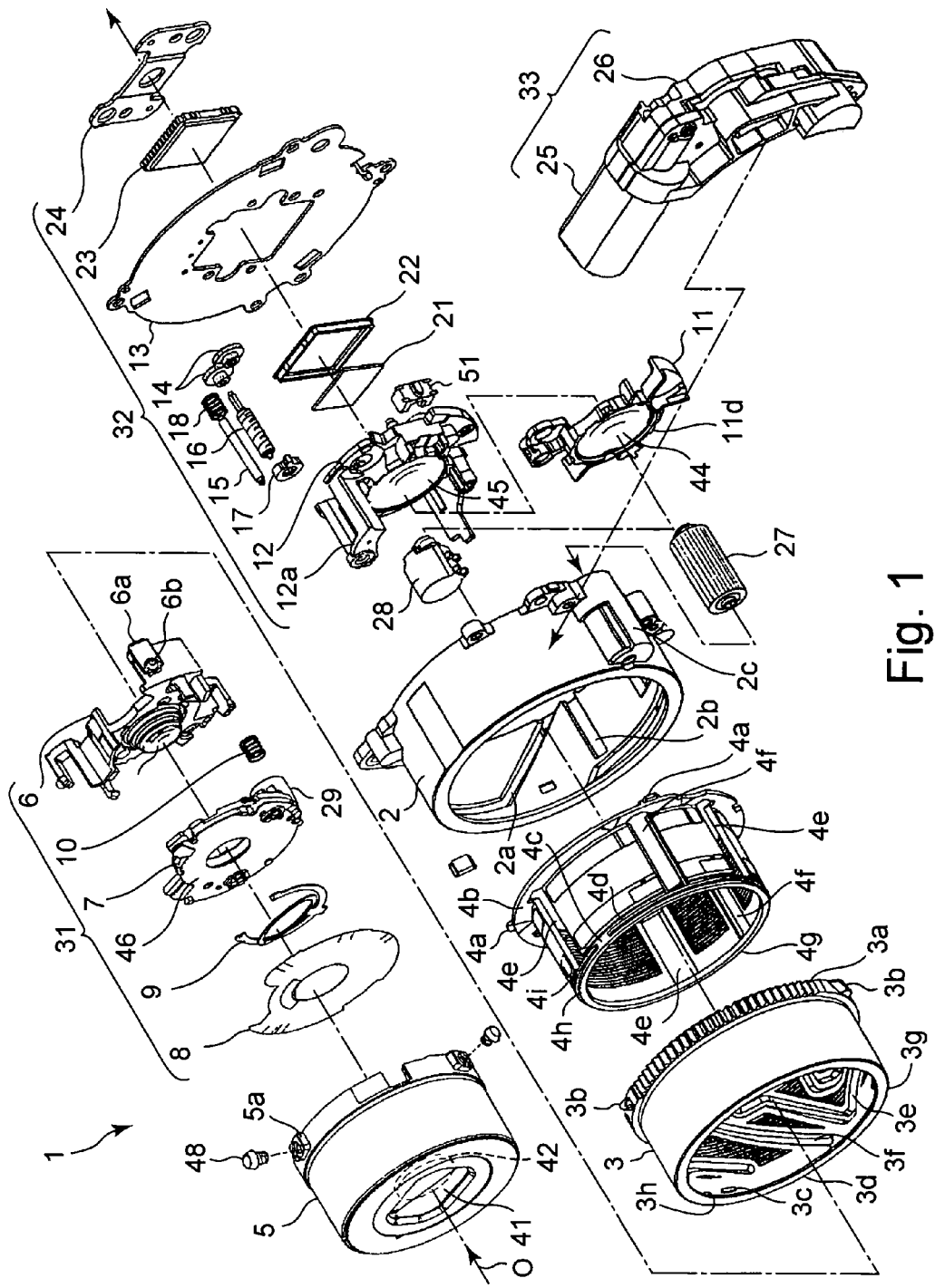
FIG. 1 is an exploded perspective view of a lens barrel according to a preferred embodiment of the present invention.

As shown in FIG. 1, a lens barrel 1 of the embodiment includes a fixed frame 2, a rotary frame 3, a rectilinear guide frame 4, a first group frame 5, a shutter/second group unit 31, a third group/fourth group/imaging unit 32, and a zoom driving unit 33.

The fixed frame 2 is fixed on the camera body side. The fixed frame 2 is a cylindrical member provided with rectilinear grooves 2b formed in the inner periphery of the fixed frame 2 along the direction of the optical axis O, cam grooves 2a, and a gear chamber 2c in which a zoom gear 27 is housed. Further, a zoom driving unit 33 having a zoom motor 25 and a gearbox 26 is mounted on the outer periphery of the fixed frame. An output gear (not shown) in a gear train incorporated in the gearbox 26 is meshed with the zoom gear 27 to transmit the rotational energy of the zoom motor 25 to the zoom gear 27.

The rotary frame 3 is fitted in the inner circumference of and supported by the fixed frame 2 to rotatably advance or retract. The rotary frame 3 is a cylindrical frame member provided with a plurality of cam grooves 3e for the first group frame and a plurality of cam grooves 3f for a second group frame on the inner periphery thereof, and a plurality of engaging protrusions 3c in the front of the inner periphery thereof. Further, a gear portion 3a in a predetermined circumferential range and a plurality of cam followers 3b are provided in the rear of the outer periphery of the rotary frame 3.

The rectilinear guide frame 4, is fitted in the inner circumference of the rotary frame 3 so that it will advance or retract together with the rotary frame 3. The rectilinear guide frame 4 is a cylindrical frame member provided with a plurality of guide protrusions 4a protruding from a rear-end flange 4b thereof. The rectilinear guide frame 4 is also provided with a plurality of first group guide grooves 4e and a plurality of second group guide grooves 4f, both as rectilinear guide through-grooves along the direction of the optical axis O to penetrate through both the inner and outer surfaces thereof.

Further, a circumferential linear protrusion 4h is formed on the outer periphery of the front portion of the rectilinear guide frame 4 along the circumferential direction thereof. A plurality of notches 4c as insertion slots for the engaging protrusions are provided on the circumferential linear protrusion 4h.

Figure 8:
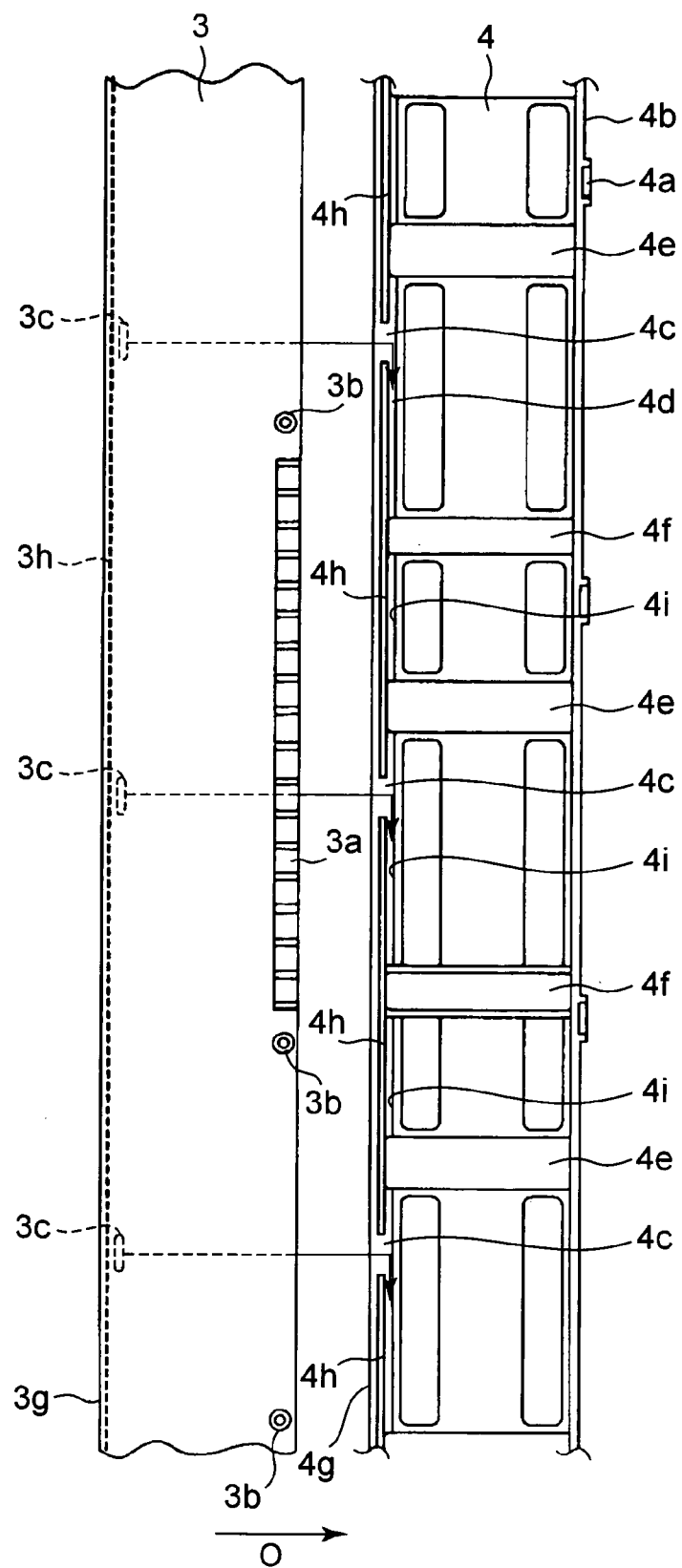
FIG. 8 is an expansion plan view of the outer peripheries of a rotary frame and a rectilinear guide frame in the lens barrel of FIG. 1.

The circumferential linear protrusion 4h is formed in a range in which the first guide grooves 4e and the second guide grooves 4f are provided in the circumferential direction. In other words, as shown in FIG. 8, the notches 4c are positioned not to overlap the positions of the first group guide grooves 4e and the second group guide grooves 4f in the circumferential direction. Then, a circumferential guide groove 4d as a circumferential groove communicating with the notches 4c is formed between the circumferential linear protrusion 4h and a circumferential stepped portion 4i spaced at a predetermined interval from the circumferential linear protrusion 4h in the optical axis direction.

The circumferential stepped portion 4i has a step or level difference higher than the front outer periphery of the rectilinear guide frame 4, and is provided in the circumferential direction except in the areas where the first group guide grooves 4e and the second group guide grooves 4f are provided. The plurality of guide protrusions 4a are engaged with the rectilinear grooves 2b of the fixed frame 2, respectively, on condition that the rectilinear guide frame 4 is incorporated in the fixed frame 2. It results in restricting the rotation of the rectilinear guide frame 4 around the optical axis with respect to the fixed frame 2.

The rectilinear guide frame 4 is set into the inner periphery of the rotary frame 3 from the rearward side thereof by inserting the engaging protrusions 3c of the rotary frame 3 into the notches 4c so that the engaging protrusions 3c will be set in and engaged with the circumferential guide groove 4d in a slidable manner (bayonet structure). In this assembled state, the rectilinear guide frame 4 is so supported that it is not allowed to move relative to the rotary frame 3 in the direction of the optical axis O but it is rotatable relative to the rotary frame 3. On the other hand, the rotation of the rectilinear guide frame 4 is restricted with respect to the fixed frame 3, so that it advances or retracts without rotation.

The front end faces 4g and 3g of the rectilinear guide frame 4 and the rotary frame 3 in the optical axis direction are on the same plane perpendicular to the optical axis O as each other viewed in the direction of the optical axis O, therefore, the front end face 4g of the rectilinear guide frame 4 is not covered by the rotary frame 3, exposing from the rotary frame 3.

Figure 5:
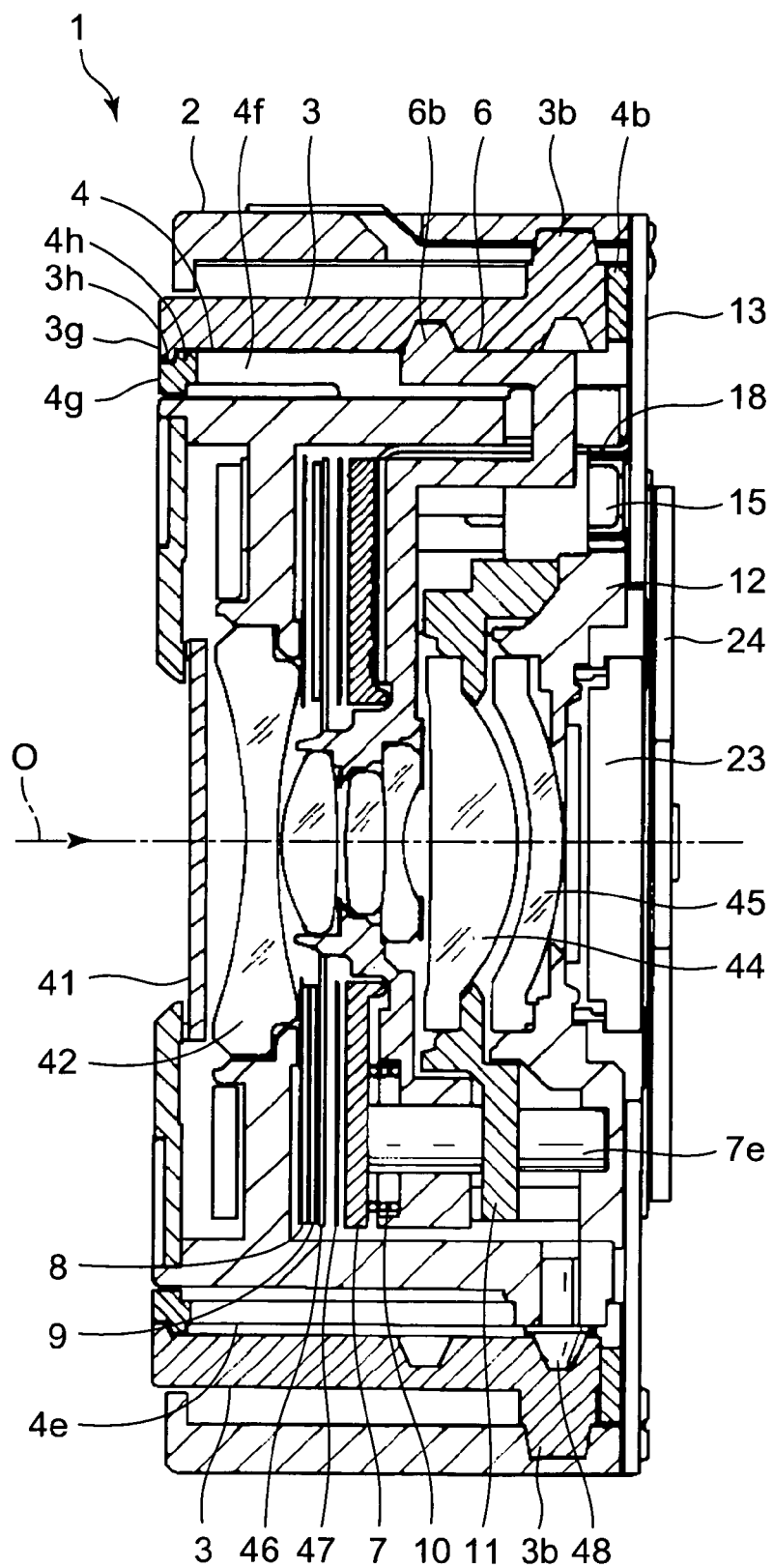
FIG. 5 is a longitudinal sectional view of the lens barrel of FIG. 1 in a retracted state.
Figure 6:
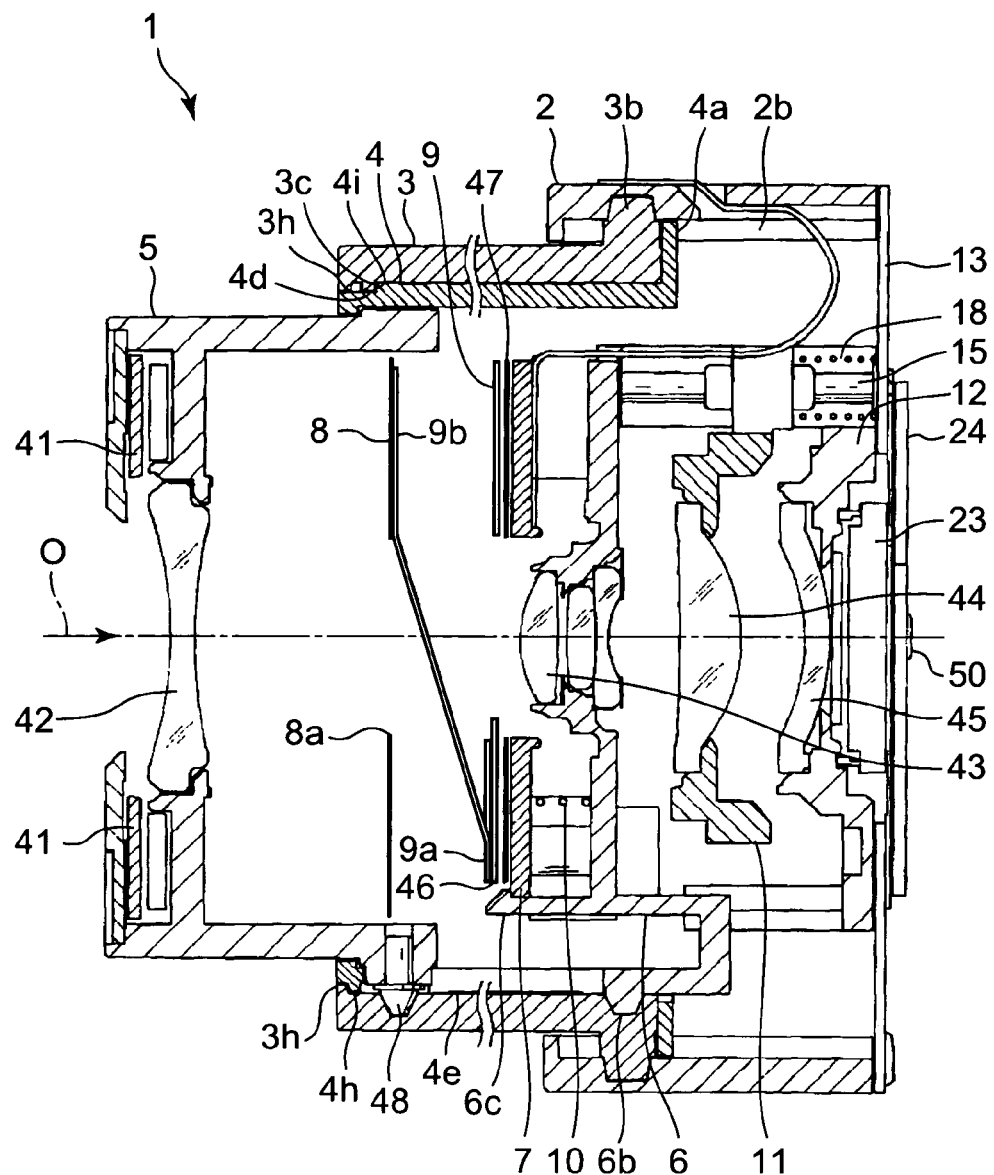
FIG. 6 is a longitudinal sectional view of the lens barrel of FIG. 1 in a wide-angle state.
Figure 7:
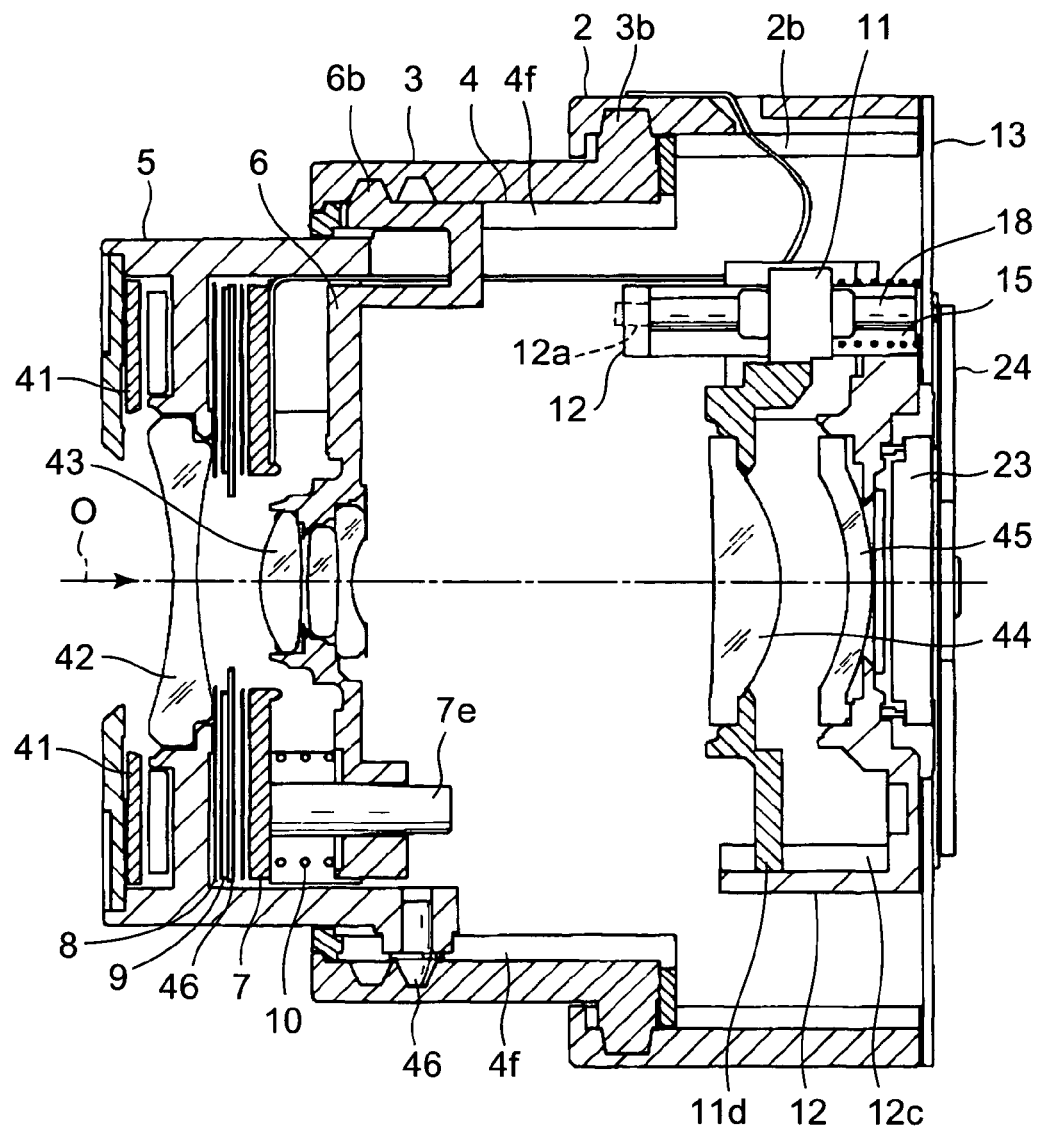
FIG. 7 is a longitudinal sectional view of the lens barrel of FIG. 1 in a telephoto state.

Further, as shown in FIGS. 5, 6, and 7, an inner circumferential face 3d of the front end face 3g is formed into a circumferential linear protrusion 3h provided around the whole circumference of the front end of the rotary frame 3. This inner circumferential face 3d is fitted with the outer periphery of the front end face 4g of the rectilinear guide frame 4 with no space therebetween. In this state, the front side of the notches 4c of the rectilinear guide frame 4 is covered by the circumferential linear protrusion 3h of the rotary frame 3. Further, the circumferential stepped portion 4i is provided behind the notches 4c (at an overlapped position in the optical axis direction) in the rectilinear guide frame 4. Therefore, outside light can be prevented from entering the guide grooves 4e and 4f through the notches 4c and hence from entering the imaging side. Further, since the notches 4c and the guide grooves 4e, 4f are arranged at positions different from each other in the circumferential direction, outside light leaked from the notches 4c can also be prevented from reaching the guide grooves 4e and 4f directly from the notches 4c. Although, the circumferential stepped portion 4i of the rectilinear guide frame 4 has cutout portions made by the existences of the guide grooves 4e and 4f, the above described feature prevents the leaked outside light from advancing from the notches 4c (first non-wall portions) to the cutout portions (second non-wall portions) directly.

In positions where the notches 4c are not provided, the circumferential linear protrusion 3h of the rotary frame 3 and the circumferential linear protrusion 4h of the rectilinear guide frame 4 are overlapping in the direction of the optical axis O, enabling effective prevention of incursion of outside light.

Then, when the rotary frame 3 in which the rectilinear guide frame 4 is set in the manner mentioned above is inserted into the inner periphery of the fixed frame 2, the gear portion 3a of the rotary frame 3 is meshed with the zoom gear 27. Concurrently, the cam followers 3b of the rotary frame 3 are set into the cam grooves 2a of the fixed frame 2. Therefore, the rotary frame 3 is driven by the rotation of the zoom gear 27 to rotate along the cam grooves 2a in such a manner that the rotary frame 3 is extended in the direction of the optical axis O from the retracted position where it is housed in the fixed frame 2 to a photographable position. Each of the cam grooves 2a has different cam lead angles between a section from the retracted position to the photographable position and a section for a zooming operation in the photographable position. In other words, when the rotary frame 3 is further rotated in the photographable position, it is displaced in the direction of the optical axis O along the cam lead section for the zooming operation to perform zooming driving. The rectilinear guide frame 4 advances or retracts integrally with the rotary frame 3 in the direction of the optical axis O while being restricted by the fixed frame 2 not to rotate.

The first group frame 5 is set into the rectilinear guide frame 4 in such a manner that it can advance or retract. The first group frame 5 is a cylindrical frame member in which a barrier 41 capable of opening and closing is placed in a front portion and a first group lens 42 is placed behind the barrier 41. Further, rectilinear key portions 5a are provided around the rear outer periphery of the first group frame 5 and cam followers 48 are mounted on the rectilinear key portions 5a in a fixed condition.

Figure 2:
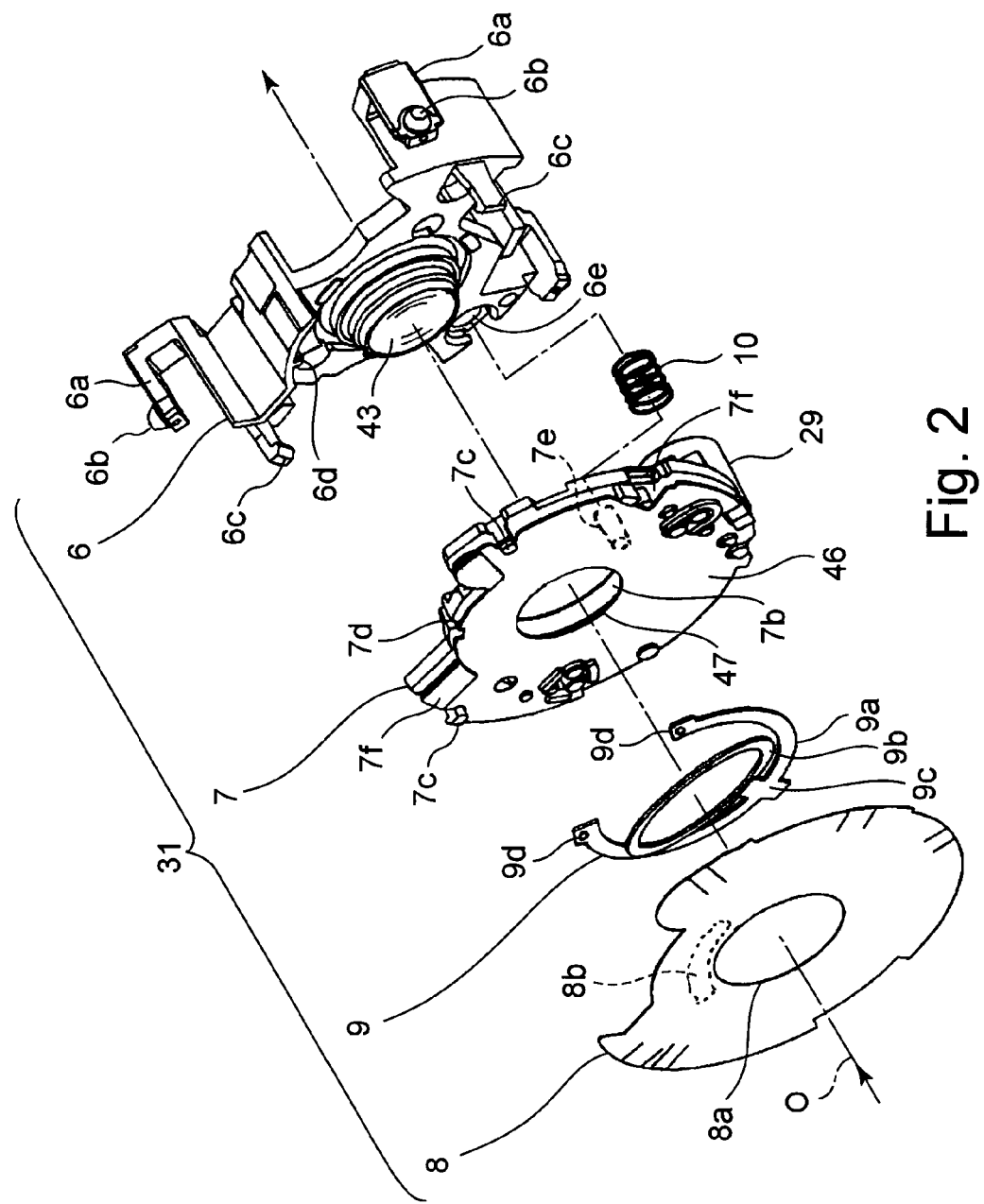
FIG. 2 is an exploded perspective view of a shutter/second group unit in the lens barrel shown in FIG. 1.

The shutter/second group unit 31 is inserted into the rectilinear guide frame 4 in such a manner that it can advance or retract. As shown in FIGS. 1 and 2, the shutter/second group unit 31 includes a shutter frame 7, a second group frame 6, and a flare aperture 8, all of which are assembled as a single unit.

The shutter frame 7 has a guide groove 7d and a guide pin 7e, and a shutter actuator 29 is incorporated in the shutter frame 7. Shutter blades 47 driven by the actuator 29 to open or close are housed in the shutter frame 7 in such a manner that they are covered with a shutter cover 46. Further, two contact surfaces 7f are provided on the outer edges of the shutter frame 7.

A second group lens 43 is held in the second group frame 6 in which rectilinear key portions 6a, cam followers 6b mounted on the key portions in a fixed condition, and claw portions 6c projecting forward are arranged in lateral positions. Further, a protruded guide portion 6d and a guide hole 6e are arranged along the optical axis O in the second group frame 6.

Then, the protruded guide portion 6d and the guide hole 6e of the second group frame 6 are set into the guide groove 7d and onto the guide pin 7e, respectively, to hold the shutter frame 7 movable relative to the second group frame 6 in such a state to be biased by the biasing spring 10 forwardly in the direction of the optical axis O.

If the shutter frame 7 is not pressed by the rear side of the first group frame 5 (in wide-angle and telephoto states in FIGS. 6 and 7), the shutter frame 7 is spaced forwardly apart from the second group frame 6 by the biasing force of the biasing spring 10, and the spaced position is determined by bringing the claw portions 6c into contact with the contact surfaces 7f, respectively. On the other hand, in the retracted state of the lens barrel, the shutter frame 7 is pressed by the rear side of the first group frame 5 through the flare aperture 8 and attached closely to the second group frame 6 (FIG. 5).

The flare aperture 8 is a ring-shaped member made of a thin plate and having a central opening 8a, and is arranged in front of the shutter frame 7 in such a state to be biased by a flare aperture biasing plate-spring 9.

Figure 3:
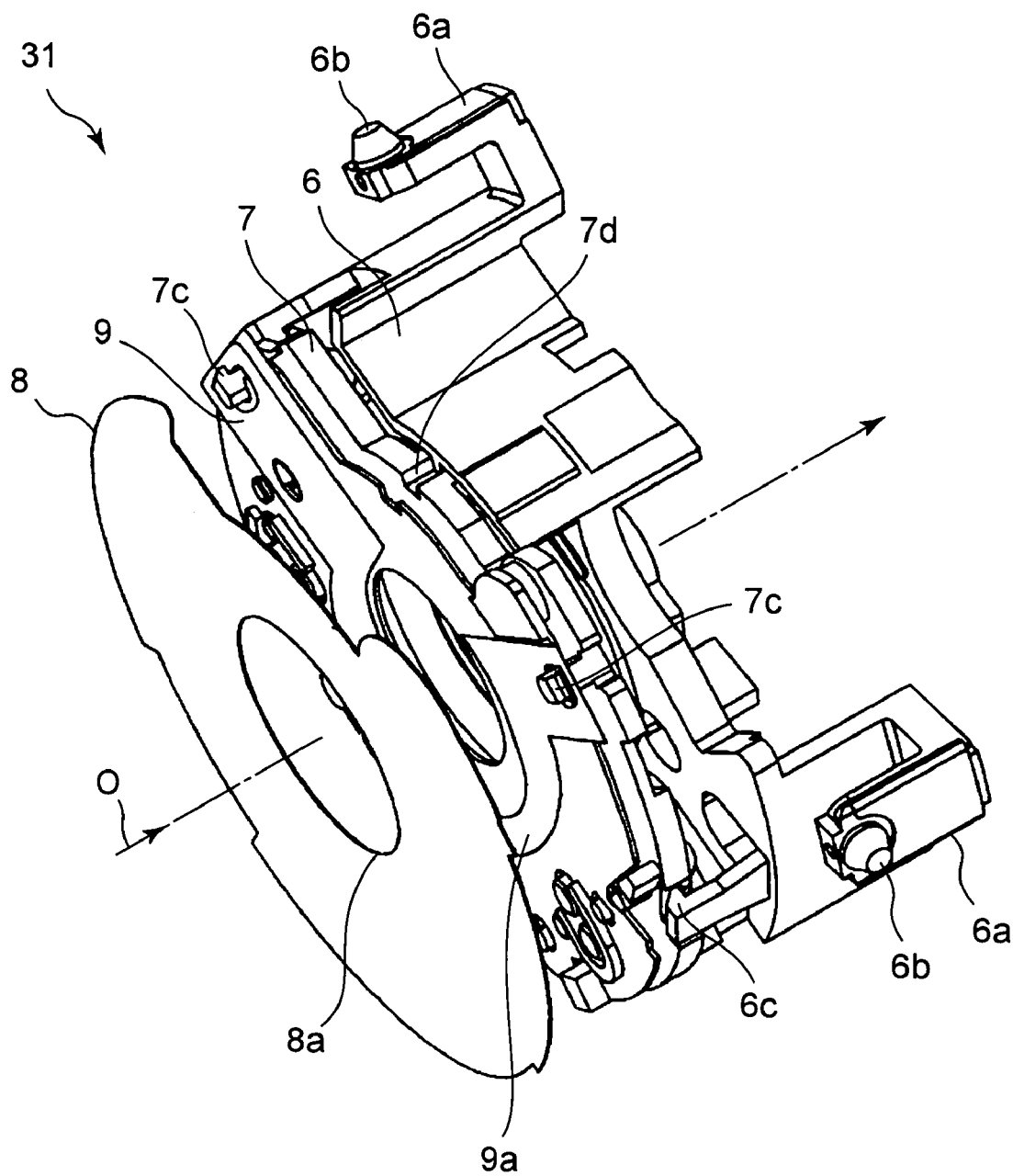
FIG. 3 is a perspective view of the shutter/second group unit shown in FIG. 2.

The flare aperture biasing plate-spring 9 is made of an elastically deformable sheet metal, including an arc-shaped mounting portion 9a and an annular biasing portion 9b having an inclined plane and connected to the mounting portion 9a through a connecting portion 9c. Retention holes 9d are formed in both end portions of the arc-shaped mounting portion 9a. The retention holes 9d are engaged with locking protrusions 7c to retain and support the mounting portion 9a on the shutter frame 7 (FIG. 3).

One end portion of the annular biasing portion 9b adhesively secured to an adhesive portion 8b of the flare aperture 8. Therefore, when the front surface of the flare aperture 8 is in a released state (in a free state) where it is not pressed by the rear side of the first group frame 3, the flare aperture 8 is held in a position orthogonal to the optical axis and spaced a predetermined distance from the shutter frame 7 as shown in FIG. 3. When the flare aperture 8 is in the spaced position, unwanted light during shooting is prevented from entering the side of the second group lens 43. On the other hand, when the front surface of the flare aperture 8 is pressed by the rear side of the first group frame 3 (the retracted state of the lens barrel in FIG. 5 or the telephoto state in FIG. 7), the annular biasing portion 9b elastically deforms to attach the flare aperture 8 closely to the side of the shutter cover 46 in such a state to sandwich the annular biasing portion 9b therebetween.

The first group frame 5 and the shutter/second group unit 31 are inserted into the rotary frame 3 from the rear side of the rotary frame 3 in the inner periphery of which the rectilinear guide frame 4 is set.

To be more specific, after the cam followers 48 are inserted into the first group guide grooves 4e of the rectilinear guide frame 4, the rectilinear key portions 5a are slidably set and further the cam followers 48 are slidably set into the cam grooves 3e of the rotary frame 3, thus incorporating the first group frame 5 into the inside of the rectilinear guide frame 4 and the rotary frame 3.

On the other hand, after the cam followers 6b of the second group frame 6 are inserted into the second group guide grooves 4f of the rectilinear guide frame 4, the rectilinear key portions 6a are slidably set and further the cam followers 6b are slidably set into the cam grooves 3f of the rotary frame 3, thus incorporating the shutter/second group unit 31 into the inside of the rectilinear guide frame 4 and the rotary frame 3.

Under the condition that the first group frame 5 and the shutter/second group unit 31 are incorporated in the manner mentioned above, if the rotary frame 3 is driven to rotate, the first group frame 5 and the shutter/second group unit 31 are not only extended in connection with the movement of the rotary frame 3 from the retracted position to the photographable position while being restricted not to rotate by the rectilinear guide frame 4, but also they are displaced respectively along the cam grooves 3e and 3f provided in the rotary frame 3. After that, during zoom driving, they advance or retract to their zoom positions, respectively.

Figure 4:
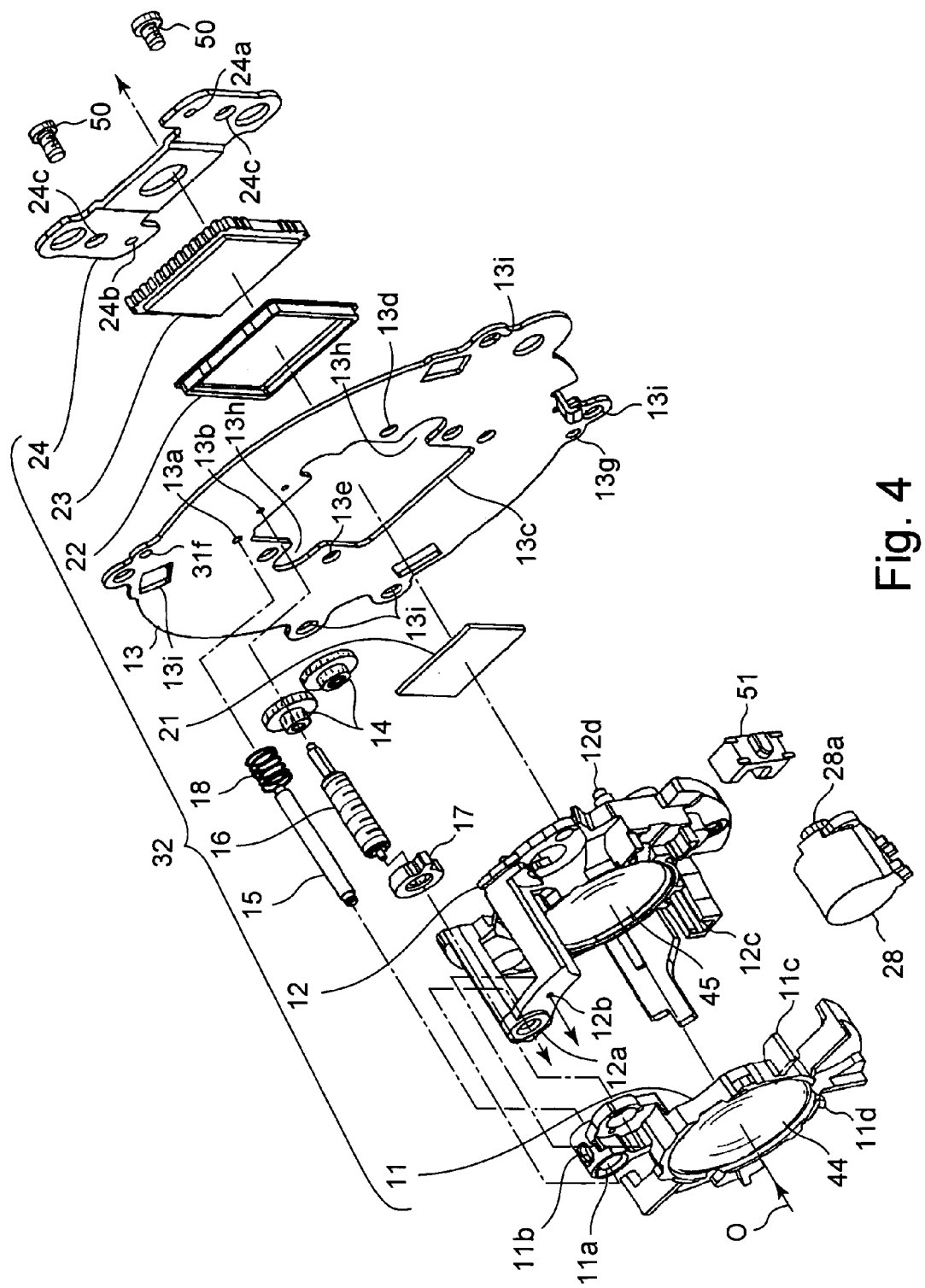
FIG. 4 is an exploded perspective view of a third group/fourth group/imaging unit in the lens barrel of FIG. 1.

The third group/fourth group/imaging unit 32 is supported inside the rear of the fixed frame 2. As shown in FIGS. 1 and 4, the third group/fourth group/imaging unit 32 includes a third group frame 11 holding a third group lens 44, a fourth group frame 12 holding a fourth group lens 45, an optical filter 21, a CCD 23 as an image pickup device, a CCD fixing plate 24, a holder bottom board 13, a focus motor 28, and a photosensor 51, all of which are assembled as a single unit.

The third group frame 11 includes a guide hole 11a into which a guide shaft 15 is slidably inserted, a hole 11b through which a threaded lead shaft 16 passes, and a guide protrusion 11d.

The fourth group frame 12 has a U-shaped projection portion in which shaft holes 12a and 12b are arranged. The slidable guide shaft 15 and the rotatable threaded lead shaft 16 are supported between the shaft holes 12a, 12b and shaft hole 13a, 13b on the holder bottom board 13 side, respectively. The focus motor 28 is also incorporated in the fourth group frame 12. An output pinion 28a of the focus motor 28 is meshed with the gear train 14 for driving the rotation of the threaded lead shaft 16. Further, two positioning pins 12d are arranged in rear end portions of the fourth group frame 12 on the imaging side to position the holder bottom board 13 and the CCD fixing plate 24, and two screw holes (not shown) are provided to fix the holder bottom board 13 and CCD fixing plate 24. These screw holes are formed into boss-like extrusions, respectively.

The holder bottom board 13 is a thin plate member having an opening 12a in its central portion to insert the CCD 23 therethrough. In the embodiment, the holder bottom board 13 is a pressed part made of metal. A positioning circular hole 13d and a positioning elongate hole 13e through which the positioning pins 12d of the fourth group frame 12 are inserted are formed in the holder bottom board 13. Two notches 13h communicating with the opening 13c are formed to insert the screw-hole bosses of the fourth group frame 12 therethrough. A positioning circular hole 13f and a positioning elongate hole 13g are formed in outer edge portions of the holder bottom board 13 to insert the positioning pins provided in the fixed frame 2 therethrough. Further, a plurality of screw insertion holes 13i are formed to secure the fixed frame 2 by screws.

The CCD fixing plate 24 is a plate on which the CCD 23 is mounted in a fixed condition. A positioning circular hole 24a and a positioning elongate hole 24b for inserting the positioning pins 12d of the fourth group frame 12 therethrough and screw insertion holes 24c for inserting screws 50 therethrough to secure the CCD fixing plate 24 to the fourth group frame 12 are provided in the CCD fixing plate 24.

In such a structure, the positioning pins 12d of the fourth group frame 12 are inserted through the positioning circular hole 13d and the positioning elongate hole 13e of the holder bottom board 13, and further through the positioning circular hole 24a and the positioning elongate hole 24b of the CCD fixing plate 24, respectively, to position the CCD fixing plate 24 on which the CCD 23 is mounted in the fixed condition and the holder bottom board 13 with respect to the fourth group frame 12. Under this condition, the screw bosses of the fourth group frame 12 are through the notches 13h of the holder bottom board 13, extending to the CCD fixing plate 24. Then, the three members are secured by the screws 50 as a single unit in such a manner that the holder bottom board 13 is sandwiched between the CCD fixing plate 24 and the fourth group frame 12.

The guide shaft 15 is inserted through the shaft hole 12a of the fourth group frame 12 and a biasing spring 18 is inserted onto the guide shaft 15. Therefore, the fourth group frame 12 is biased forward by the biasing spring 18. Further, the guide protrusion lid of the third group frame 11 is slidably inserted into a guide groove 12c of the fourth group frame 12 at a position opposite to the guide shaft 15. Thus, the third group frame 11 is supported in such a manner to be restricted not to rotate about the optical axis O. On the other hand, a nut is screwed onto the threaded lead shaft 16. The nut 17 is engaged with a guide groove formed in the fourth group frame 12 to extend in the optical axis direction so that the rotation of the nut 17 will be restricted. In such a structure, the third group frame 11 is in contact with the fourth group frame 12 by the biasing force of the biasing spring 18. Under this condition, when the threaded lead shaft 16 is rotated, the nut 17 is displaced in the direction of the optical axis O, and the third group frame 11 also moves integrally in the direction of the optical axis O.

The fourth group frame 12 assembled with the third group frame 11 is positioned in front of the holder bottom board 13 and secured by screws. Under the above assembled condition, when the threaded lead shaft 16 is driven to rotate by the focus motor 28, the third group frame 11 is driven through the nut 17 to advance or retract in the direction of the optical axis O (focusing driving). The moving position of the third group frame 11 is detected by detecting the position of the protrusion 11c by the photosensor 51b supported by the fourth group frame 12.

The holder bottom board 13 on which the third group frame 11 and the fourth group frame 12 are mounted is secured on the rear side of the fixed frame 2 by screws.

The CCD 23 fixed on the CCD fixing plate 24 is sealed by a sealing frame member 22 together with the optical filter 21 from their surroundings, incorporated into the fourth group frame 12 through the opening 13c of the holder bottom board 13, and retained in an imaging position.

Thus, in the embodiment, a holding part (fourth group frame 12) for holding the image pickup device and the optical members such as the CCD 23, the fourth group lens 45, and the optical filter 21, and a fixing part (holder bottom board 13) for fixing, to the fixed frame 2, the third group/fourth group/imaging unit 32 as an imaging unit including these image pickup device and optical members are constructed as different members. Particularly, in the embodiment, the holder bottom board 13 is formed into a thin plate shape. This makes it possible to make the lens barrel 1 thinner in the housed state.

The advancing/retracting operation of the lens barrel 1 of the embodiment having the above structure will next be described with reference to FIGS. 5 to 7.

When the lens barrel 1 is in the housed state, the third group frame 11 is in a retracted state by the driving of the focus motor 28 where it comes substantially in contact with the fourth group frame 12 as shown in FIG. 5. The rotary frame 3 is driven to rotate by the zoom motor 25 so that it is retracted together with the rectilinear guide frame 4 to its housed position with less clearance inside the fixed frame 2 in the direction of the optical axis O. Under this condition, the front end faces 3g and 4g of the rotary frame 3 and the rectilinear guide frame 4 form an identical plane, and are both exposed to the front side. This state is the same when the rotary frame 3 is extended to the photographable position.

On the other hand, the first group frame 5 and the second group frame 6 are retracted to its housed position in the same manner according to the rotation and retraction of the rotary frame 3. The flare aperture 8 and the shutter frame 7 are pressed rearward by the rear side of a lens holding part of the first group frame 5 that is at its housed position to make the biasing spring 10 and the biasing plate spring 9 flexed. The flare aperture 8 comes close to the shutter cover 46 and the shutter frame 7 moves to a position where it is attached closely to the second group frame 6. Under this retracted (housed) condition, all the components from the first group frame 3 to the CCD 23 are held with little clearance in the direction of the optical axis O.

In this housed state, the shutter blades 47 are at the open position and the shutter opening is in the open state. Then, part of the second group lens 43 that forms part of a photographing optical system is in such a state to enter the shutter opening and the opening 8a of the flare aperture 8. Thus, in the housed state, each spacing between members can be narrowed, and hence a thinner lens-barrel frame retracting structure can be realized.

Then, when the zoom motor 25 is driven to shift from the housed state to a wide-angle state in which shooting is made possible, the rotary frame 3 is driven to rotate as shown in FIG. 6, and extended to the photographable wide-angle position in the direction of the optical axis O. The rectilinear guide frame 4 is also extended integrally with the rotary frame 3 while being restricted not to rotate. On the other hand, the first group frame 5 and the second group frame 6 are extended to the wide-angle position while being restricted not to rotate in connection with the rotation and extension of the rotary frame 3. The shutter frame 7 moves to a position where it is restricted by the claw portions 6c not further to move apart from the second group frame 6. Since the front side of the flare aperture 8 also moves apart from the rear side of the first group frame 5, the flare aperture 8 moves to an aperture position by the biasing force of the biasing plate spring 9 while moving apart from the shutter cover 46.

Further, when the zoom motor 25 is driven to enter a telephoto state, the rotary frame 3 is driven only in the rotation direction, so that the first group frame 5 and the second group frame 6 moves to a telephoto position along the cam grooves 3e and 3f as shown in FIG. 7. Since the second group frame 6 is extended to come close to the first group frame 5, the biasing plate spring 9 flexes to make the flare aperture 8 substantially attached closely to the shutter cover 46 side together with the biasing plate spring 9. On the other hand, since the shutter frame 7 is pressed by the biasing spring 10 greater in biasing force than that of the biasing plate spring 9, it is extended together with the second group frame 6 in such a state that the biasing plate spring 9 remains flexed.

Thus, since the biasing force of the spring biasing the flare aperture 8 is set smaller than the biasing force of the spring biasing the shutter frame 7, the position of the shutter frame 7 can be maintained stable with respect to the second group frame 6 in the optical axis direction when the lens barrel 1 is in a photographable state.

On the other hand, when the focus motor 28 is driven to perform focusing, the threaded lead shaft 16 is driven to rotate and hence the third group frame 11 is driven to a focusing position according to the subject distance.

According to the lens barrel of the embodiment, since the rotary frame 3 does not cover the rectilinear guide frame 4 on its front end side, exposing the front end faces 3g and 4g of both to the outside of the lens barrel, a thickness for a frame member to cover the rectilinear guide frame 4 becomes unnecessary. This makes it possible to reduce the length of the lens barrel in the direction of the optical axis O in the housed state, and hence to realize a smaller (thinner) lens barrel.

Further, since the notches 4c on the rectilinear guide frame 4 side for inserting the engaging protrusions 3c of the rotary frame 3 are covered with the front end face 3g of the rotary frame 3, outside light can be prevented from entering inside through the notches 4c. The positions of the notches 4c and the positions of the first and second guide grooves 4e and 4f differ from one another in the circumferential direction, so that outside light leaking from the fitting clearance through the notches 4c can be prevented from entering the first and second guide grooves 4e and 4f.

Furthermore, since the lens barrel employs such a structure that the flare aperture 8 is attached to the shutter frame 7 through the thin plate-shaped biasing plate spring 9, the flare aperture 8 is spaced a proper distance from the second group frame 6 to function as the flare aperture when the first group frame and the second group frame 6 are spaced from each other, while in the housed state, the flare aperture 8 is attached closely to the shutter cover 46 to reduce the size occupied by the flare aperture and its vicinities in the direction of the optical axis O.

The lens barrel of the present invention has such a simple structure that can be used as a lens barrel capable of being further thinner in the housed state.

While there has been shown and described what is considered to be a preferred embodiment of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. A lens barrel comprising:
   a fixed frame;
   a rotary frame for rotating with respect to the fixed frame to advance or retract with respect to the fixed frame in an optical axis direction;
   a rectilinear guide frame arranged inside the rotary frame to be rotatable relative to the rotary frame and displace integrally with the rotary frame in the optical axis direction;
   a circumferential groove provided around an outer circumference of the rectilinear guide frame; and
   an engaging protrusion provided around an inner circumference of the rotary frame to engage with the circumferential groove,
   wherein a front end portion of the rectilinear guide frame on a subject side in the optical axis direction is exposed from the rotary frame.

2. The lens barrel according to claim 1 wherein
   the rectilinear guide frame has a rectilinear guide through-groove extending in the optical axis direction, and an insertion slot for inserting the engaging protrusion into the circumferential groove, and
   the rectilinear guide through-groove and the insertion slot are arranged in different positions in a circumferential direction of the rectilinear guide frame.

3. The lens barrel according to claim 2 wherein an inner circumferential face of a front end portion of the rotary frame is formed into a circumferential linear protrusion protruding inward of the rotary frame and extending in a circumferential direction.

4. The lens barrel according to claim 3 wherein the circumferential linear protrusion is arranged to cover the insertion slot.

5. The lens barrel according to claim 4 wherein the circumferential linear protrusion is formed around the whole circumference.

6. The lens barrel according to claim 2 further comprising:
   a cam groove provided in an inner periphery of the rotary frame; and
   a lens holding frame having an engaging portion to engage with the rectilinear guide through-groove and a cam follower to engage with the cam groove,
   wherein the lens holding frame advances or retracts along the cam groove in the optical axis direction according to the rotation of the rotary frame.

7. The lens barrel according to claim 6 further comprising:
   a shutter supported capable of advancing or retracting with respect to the lens holding frame in the optical axis direction, the shutter arranged closer to a subject side than the lens holding frame in the optical axis direction; and
   a shutter biasing spring for biasing the shutter in a direction to move away from the lens holding frame,
   wherein when the lens barrel is in a housed state, the shutter is displaced against a biasing force of the shutter biasing spring to a position to come close to the lens holding frame.

8. The lens barrel according to claim 7 further comprising a rectilinear frame arranged closer to the subject side than the shutter to advance or retract in the optical axis direction according to the rotation of the rotary frame,
   wherein when the lens barrel is in the housed state, the shutter is pressed by the rectilinear frame and displaced to the position to come close to the lens holding frame.

9. The lens barrel according to claim 7 further comprising:
   an aperture supported capable of advancing or retracting with respect to the shutter in the optical axis direction, the aperture arranged closer to the subject side than the shutter in the optical axis direction; and
   an aperture biasing spring for biasing the aperture in a direction to move away from the shutter,
   wherein when the lens barrel is in the housed state, the aperture is displaced against a biasing force of the aperture biasing spring to a position to come close to the shutter.

10. The lens barrel according to claim 9 further comprising a rectilinear frame arranged closer to the subject side than the aperture to advance or retract in the optical axis direction according to the rotation of the rotary frame,
wherein when the lens barrel is in the housed state, the aperture is pressed by the rectilinear frame and displaced to the position to come close to the shutter.

11. The lens barrel according to claim 1 wherein the front end portion of the rectilinear guide frame in the optical axis direction and a front end portion of the rotary frame in the optical axis direction are located in substantially the same position in the optical axis direction.

12. A lens barrel comprising:
a first frame;
a second frame rotating with respect to the first frame to advance or retract with respect to the first frame in an optical axis direction;
a third frame arranged inside the second frame to be rotatable relative to the second frame and displace integrally with the second frame in the optical axis direction;
a circumferential groove provided around an outer circumference of the third frame; and
an engaging protrusion provided around an inner circumference of the second frame to engage with the circumferential groove,
wherein a front end portion of the third frame on a subject side in the optical axis direction is exposed from the second frame.

13. The lens barrel according to claim 12 wherein
the third frame has first and second rectilinear guide through-grooves extending in the optical axis direction, and an insertion slot for inserting the engaging protrusion into the circumferential groove, and
the first and second rectilinear guide through-grooves and the insertion slot are arranged in different positions in a circumferential direction of the third frame.

14. The lens barrel according to claim 13 wherein an inner circumferential face of a front end portion of the second frame is formed into a circumferential linear protrusion protruding inward of the second frame and extending in a circumferential direction, the circumferential linear protrusion arranged to cover the insertion slot.

15. The lens barrel according to claim 13 further comprising:
first and second cam grooves provided in an inner periphery of the second frame;
a first lens holding frame having an engaging portion to engage with the first rectilinear guide through-groove and a cam follower to engage with the first cam groove, the first lens holding frame advancing or retracting along the first cam groove in the optical axis direction according to the rotation of the second frame; and
a second lens holding frame having an engaging portion to engage with the second rectilinear guide through-groove and a cam follower to engage with the second cam groove, the second lens holding frame advancing or retracting along the second cam groove in the optical axis direction according to the rotation of the second frame.

16. The lens barrel according to claim 15 further comprising:
a shutter supported capable of advancing or retracting with respect to the second lens holding frame in the optical axis direction, the shutter arranged between the second lens holding frame and the first lens holding frame in the optical axis direction; and
a shutter biasing spring for biasing the shutter in a direction to move away from the second lens holding frame and toward the first lens holding frame,
wherein when the lens barrel is in a housed state, the shutter is displaced against a biasing force of the shutter biasing spring to a position to come close to the second lens holding frame.

17. The lens barrel according to claim 16 wherein when the lens barrel is in the housed state, the shutter is pressed by the first lens holding frame and displaced to the position to come close to the second lens holding frame.

18. The lens barrel according to claim 16 further comprising:
an aperture supported capable of advancing or retracting with respect to the shutter in the optical axis direction, the aperture arranged between the shutter and the first frame in the optical axis direction; and
an aperture biasing spring for biasing the aperture in a direction to move away from the shutter and toward the first lens holding frame,
wherein when the lens barrel is in the housed state, the aperture is displaced against a spring force of the aperture biasing spring to a position to come close to the shutter.

19. The lens barrel according to claim 18 wherein when the lens barrel is in the housed state, the aperture is pressed by the first lens holding frame and displaced to the position to come close to the shutter.

20. A lens barrel comprising:
a cylindrical first frame arranged coaxially with a lens optical axis;
a cylindrical second frame arranged coaxially with the first frame, the second frame having a groove formed to engage with the first frame rotatably relative to each other along a circumference of the second frame; and
an engaging protrusion provided on the first frame to fit in the groove,
wherein a first non-wall portion in which a side wall does not exist for allowing the protrusion to pass through is provided on one side wall of the groove, a second non-wall portion is provided on the other side wall of the groove, since the position of the first non-wall portion and the position of the second non-wall portion differing from each other on the circumference, light entering from one non-wall portion does not directly reach the other non-wall portion.

* * * * *